S. P. BUSH.
MEANS FOR SECURING THE JOURNAL BOX OF A CAR TRUCK TO THE TRUCK SIDE FRAME.
APPLICATION FILED DEC. 10, 1910.
1,014,565.
Patented Jan. 9, 1912.
2 SHEETS—SHEET 1.
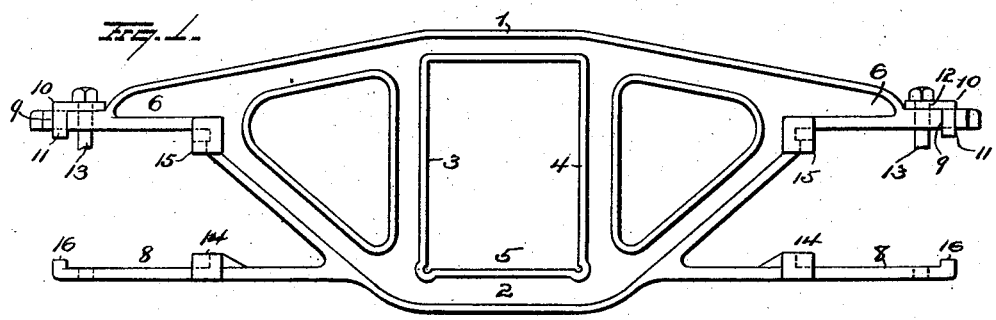
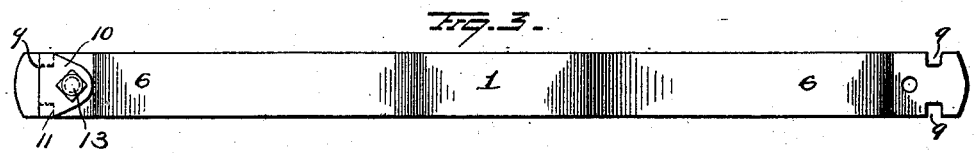
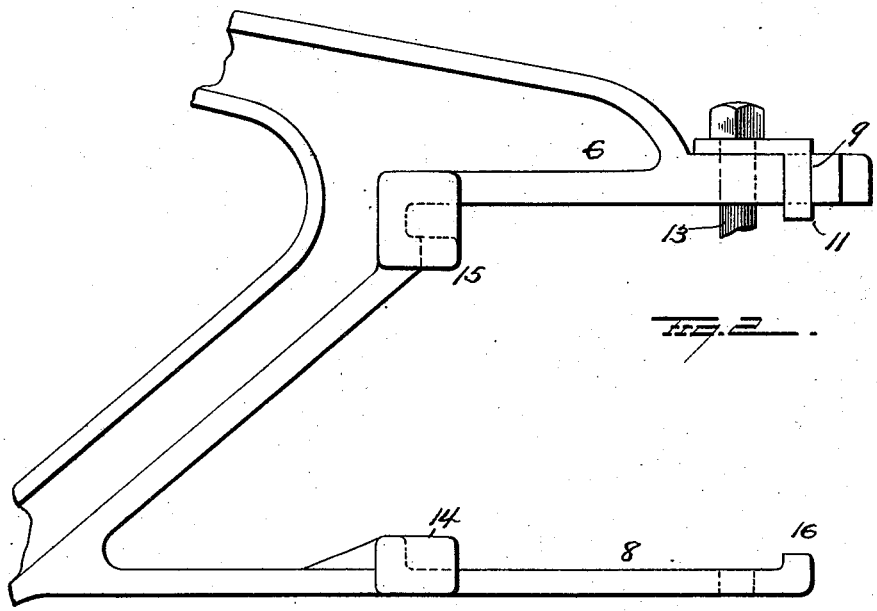
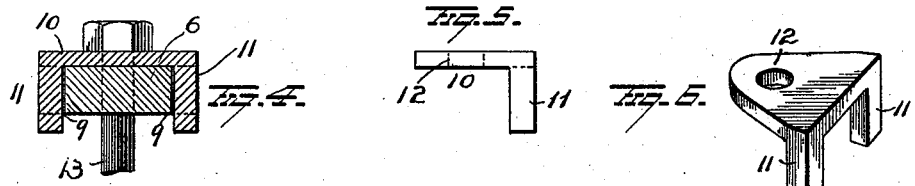
WITNESSES
INVENTOR S. P. BUSH.
MEANS FOR SECURING THE JOURNAL BOX OF A CAR TRUCK TO THE TRUCK SIDE FRAME.
APPLICATION FILED DEC. 10, 1910.
1,014,565.
Patented Jan. 9, 1912.
2 SHEETS—SHEET 2.
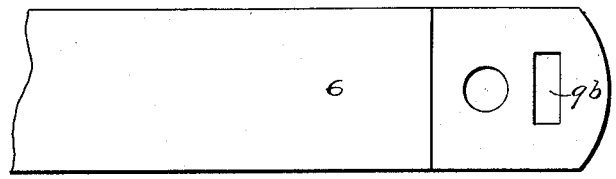
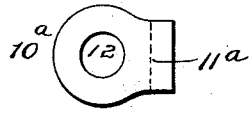
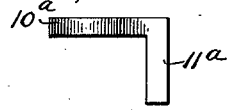
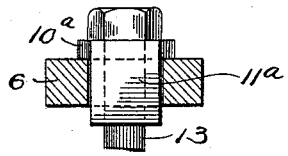
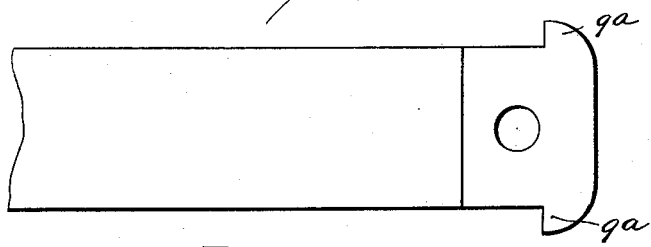
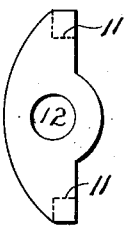
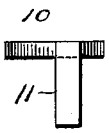
WITNESSES
INVENTOR
Attorney

UNITED STATES PATENT OFFICE.

SAMUEL P. BUSH, OF COLUMBUS, OHIO, ASSIGNOR TO THE BUCKEYE STEEL CASTINGS COMPANY, OF COLUMBUS, OHIO.

MEANS FOR SECURING THE JOURNAL-BOX OF A CAR-TRUCK TO THE TRUCK SIDE FRAME.

1,014,565. Specification of Letters Patent. Patented Jan. 9, 1912.

Application filed December 10, 1910. Serial No. 596,733.

*To all whom it may concern:*

Be it known that I, SAMUEL P. BUSH, of Columbus, in the county of Franklin and State of Ohio, have invented certain new and useful Improvements in Means for Securing the Journal-Box of a Car-Truck to the Truck Side Frame; and I do hereby declare the following to be a full, clear, and exact description of the invention, such as will enable others skilled in the art to which it appertains to make and use the same.

My invention relates to means for securing the journal box of a car truck to the truck side frame.

In another application executed even date herewith, I have described and claimed means integral with the truck frame for securing the journal box against lateral displacement.

This invention comprises means separable from the truck frame or parts thereof for securing the journal box in position, and for relieving the journal box bolt, either wholly or partially, of the stresses that may be imposed upon it, and which would tend to force the box out from between the jaws.

In the accompanying drawings, Figure 1 is a view in side elevation of a truck frame embodying my invention. Fig. 2 is an enlarged view of one end of same. Fig. 3 is a plan view of the upper jaw. Fig. 4 is a view in section through the same. Figs. 5 and 6 are views of the clamping plate. Figs. 7, 8, 9, 10, 11, 12 and 13 are views of modified forms.

My invention consists of a structure resembling a truss, of which 1 is the upper or compression member and 2 is the lower or tension member, the two members meeting each other at either end, and being connected near the center by the two members 3 and 4, which are generally designated as column guides. Between the upper and lower members and between these column guides is an opening adapted to receive the car bolster, which may be supported by springs resting on a spring seat 5, or it may be otherwise supported. Beyond the junction of members 1 and 2 at each end of the frame, is an extension or jaw 6 which extends over and rests on top of the journal box when the latter is in its position. It is the function of each extension or jaw 6, therefore, to carry one-fourth of the total load coming on the truck. From the lower member 2, there is extended at each end of the frame, from the center, a member 8, which may be designated as tie-bars, the object of these being to supply a bottom connection to the journal boxes so as to assist in holding them securely against possible movement from application of the brakes or from shocks that a car may receive in service.

The extension 6 is constructed according to any good practice, except that at the end I have provided notches 9. Instead of having these notches as shown, shoulders may be provided on the extension as shown at 9ª in Fig. 11.

10 is a clamping plate having a downward projection 11, and also provided with a hole 12 adapted to receive the journal box bolt 13. These projections or abutments 11 are intended to be received into the grooves 9 or rest against the shoulders 9ª as in Fig. 11. The hole 12 in the clamping plate is intended, when the latter is in position, to match with the journal box bolt hole in the extension or jaw 6.

In the construction shown in Fig. 7 the extension or jaw 6 is provided with an angular slot 9ᵇ, and the clamping plate 10ª is provided with a single angular lug or abutment 11ª which passes through said angular slot and rests in a position to receive the side or lateral strains on the journal box. In all of these constructions the lugs 11 are supported at their outer sides by abutments extending throughout the depth or thickness of the extension, so that all pressure against the lugs are transmitted to the abutments on the extension and not to the plates 10, or bolts 13.

The journal box is introduced horizontally between the extension or jaws 6 and 8, and up to and against the lug 15 on the upper extension or jaw 6 with its lower side between and abutting against the lug 14 and the lug 16 the latter projecting up at the free end of the lower extension or jaw. The lugs or abutments on the clamping plate 10 project below the extension or jaw 6, and into the plane of the top of the journal box and bear against the outer side of the latter, and the plate 10 and journal box are locked in place by the bolt 13, which latter passes through the plate and upper and lower extensions or jaws 6 and 8; and secured in place by a nut which when screwed up tight forces lug 16 solidly against the outer side of the lower end of the journal box. The bolt 13 therefore locks the clamping plate 10 in place while the lugs or projection 11 or 11ª are supported by shoulders which take the strain in the event of any force tending to drive the journal box outwardly, thus relieving the bolt 13 either wholly or in part from such stress. To remove the journal box, it is simply necessary to remove bolt 13, which leaves the clamping plate free to be removed, thus clearing the way for the free withdrawal of the journal box. It is evident that instead of applying the clamping plate to the upper extension or jaw 6 it may be applied precisely in the same manner to the lower extension or jaw.

It is evident that many slight changes might be resorted to in the relative arrangement of parts shown and described without departing from the spirit and scope of my invention. Hence I would have it understood that I do not wish to confine myself to the exact construction shown and described, but, Having fully described my invention what I claim as new and desire to secure by Letters-Patent, is:—

1. A journal box retaining means comprising a plate supported against the outer face of a member carrying the journal box, and provided with an integral lug the latter having bearing against said member throughout the entire thickness of the latter, and projecting beyond the same so as to form a stop or abutment for the journal box and a bolt passing through said plate for locking same and its integral lug to the truck frame.

2. A truck frame having an extension or jaw provided with an abutment or support of approximately the thickness of said jaw, a plate resting on the outer face of said extension or jaw and provided with a lug bearing against said abutment and supported against outward displacement by the latter, the said lug projecting inwardly beyond said extension or jaw, and a journal box bolt passing through said extension or jaw and said plate for locking the latter in place.

3. In combination of a truck side frame having two supporting members for each journal box, one of said members having an abutment approximately the thickness of said member, a plate resting on said member, and provided with a lug having outward bearing against said abutment, the said lug projecting inwardly beyond said member to form a stop for the journal box, and a bolt passing through both supporting members and through the plate.

In testimony whereof, I have signed this specification in the presence of two subscribing witnesses.

SAMUEL P. BUSH.

Witnesses:
 GEO. G. WERRING,
 W. E. PAGE.

---

Copies of this patent may be obtained for five cents each, by addressing the "Commissioner of Patents, Washington, D. C."